Patented Dec. 15, 1942

2,305,404

UNITED STATES PATENT OFFICE 2,305,404

METHOD OF MAKING CLAY FILLERS

Wilson F. Brown, Hamilton, Ohio, assignor to The Champion Paper and Fibre Company, Hamilton, Ohio, a corporation of Ohio No Drawing. Application September 8, 1939, Serial No. 293,979

4 Claims. (Cl. 83—94)

This invention relates to a process of treating china clay to produce a filler having novel and valuable properties which make it particularly useful for paper loading and paper coating purposes. The low cost of china clay, its absorptivity to printing ink and its finishing properties make it a particularly valuable material in the manufacture of high grade printing papers.

Crude china clay commonly consists largely of partially disintegrated crystals of kaolinite of various sizes and almost invariably contains some sand, mica, and other impurities. In processing this clay for use in the paper industry it is customary to remove these impurities by sedimentation, air flotation, etc. Sometimes no further processing is given the clay. Frequently the clay is further subjected to a classification process whereby fractions of clay of different particle sizes are obtained. The fractions of finer particle size are used as fillers in paper coating compositions of the more costly grades of coated paper. The coated paper made from them is smoother and more highly finished and has better printing properties than that made from unclassified clays under the same conditions of coating, calendering, etc. However, these clays are comparatively costly since they represent only certain proportions of the original clays, and the residues must be disposed of as inferior by-products.

Grinding the raw clay, by methods now known, to produce a product comparable to the fine fractions of classified clay is also an expensive procedure, and whether produced by classifying or grinding, china clay of fine particle size is now available only at prices which preclude its use in substantial quantities in coating compositions for the cheaper grades of paper.

The finely classified and finely ground clays not only cost more than coarser clays, but also cost more to use for the reason that considerably larger quantities of casein or other paper coating adhesives are required to adequately bind the finer clays to the paper.

One object of the present invention is to provide a simple, inexpensive method of processing certain china clays to provide high grade coating clay comparable to the finer fractions of clay classified by present known methods.

Another object of the invention is to provide a process of treating clay to give coated papers made therefrom gloss, smoothness, and printing quality comparable to the gloss, smoothness, and printing quality of papers coated with classified clays, but with a much smaller quantity of adhesive than required to bind classified clays and similar finely ground coating compositions to the paper.

Although the processing adds but little to the cost of the clay, the improvement in gloss and smoothness of coated paper made from the processed clay as compared to coated paper made from the same clay, but unprocessed, is striking. For example, in a typical case the finish as measured by the Bausch & Lomb glossmeter was raised from a value of 47 per cent to a value of 62 per cent. This was accompanied by a marked improvement in the printing qualities of the sheet. Also, the brightness of the coated paper was somewhat higher. These effects have heretofore been obtained only by the use of relatively costly ingredients such as satin white and classified clays, both of which require much larger quantities of casein to prevent flouring or picking of the coating on the printing press.

Clay processed according to the invention of this application also improves the quality of uncoated paper when used as a filler added to the beater in lieu of the unprocessed clay. The improvement, although not as striking as in the case of paper coated with the processed clay, is, nevertheless, definitely reflected in better finish, reduced tendency to flour or dust, and improved printing quality.

I have found that the above mentioned improvement in the properties of certain china clays may be accomplished by subjecting the clay to a severe "shearing" action such as hereinafter described. The clay should be somewhat damp during the treatment, but should not contain enough water to be fluid or even pasty or plastic. Under these conditions the larger kaolinite crystals are broken down with remarkable ease.

My experience with a number of clays indicates that the optimum results are obtained when the moisture content is approximately 13 per cent of the wet weight of the clay. Moisture content as herein defined means the moisture lost at 100°–105° C. and not water of combination or water of crystallization. The effectiveness of the process decreases more rapidly the greater the departure from this value until, below five per cent, the clay is too dry for effective treatment. The upper limit of water content depends upon the water-absorbing properties of the particular china clay used, some clays becoming too plastic for effective treatment at moisture contents of 20 per cent while others may be worked at moisture values as high as 27 per cent.

Not all china clays respond equally to this process. The improvements are most marked on those clays which contain a considerable proportion of larger kaolinite crystals, e. g., containing at least 10 per cent of kaolinite crystals of the order of 5 mu or larger in their largest dimensions. The process may be employed with advantage on the coarser fractions of classified clays. The finer fractions of classified clays are not particularly improved by the treatment, presumably because of the absence of any considerable proportion of relatively large kaolinite crystals.

Apparatus suitable for carrying out the process consists of one or more pairs of rotating rolls pressed together by springs under a predetermined pressure.

The pressure used may vary with the character of the raw clay, the character of finished product desired, the speed of operation, the number, size, and character of the rolls, etc. The roll surfaces may be smooth, rough, or fluted, as desired in each particular case. The diameters and face widths of the rolls may be correlated with the speed of rotation to give the desired production. The number of passes between rolls will vary with the degree of processing required and the roll size, character, and pressures. The effect of the first passage through the rolls is quite marked and each succeeding passing has a less noticeable effect, unless pressures are increased or other conditions changed.

In most cases roll pressures between 300 and 500 pounds per linear inch appear to be satisfactory. Pressures less than 100 pounds per inch are not ordinarily adequate and in some cases pressures of 1,000 pounds or more per inch may be advantageous.

In order to secure proper concentration of this pressure on the clay being treated it is desirable that only a thin layer of clay be treated. Without excessive pressures, or very large equipment, this layer is not ordinarily over half an inch in thickness as it issues from the rolls, and is preferably much thinner—one eighth to one thirty-second of an inch being advantageous in many cases. Better results are obtained if the thickness of the layer of clay supplied to the rolls is substantially uniform across the roll face. This can be accomplished by supplying the clay to the rolls in small lumps spread out in a layer of uniform thickness and fed at a uniform rate by means of any of the known types of feeder adapted to give uniform distribution.

As illustrating one embodiment of the invention the following example is given. The raw material consisted of a batch of unrefined Georgia coating clay containing 20 per cent moisture as received from the mine. The large lumps of crude clay were roughly cut or broken into smaller sizes of not over one inch diameter and partially dried in a rotary drier to a moisture content of about 13 per cent. This material was fed between two twelve-inch diameter by twelve-inch long, smooth, but unpolished rolls, pressed together by means of springs at a pressure of about 350 pounds per inch. The rolls were rotated at 350 feet per minute by independent motors. The clay was fed at such a rate that it issued from the nip between the rolls as a thin ribbon not over one-eighth inch in thickness. The clay was passed through the rolls ten times. Thereafter, it was made into a coating composition with water and casein solution, the composition containing 40 parts clay, 4 parts casein, and 56 parts water. The coating was screened through a 200 mesh screen and applied to a standard grade of coating stock, dried, and supercalendered. Another sheet of coated paper was prepared under identical conditions except that the clay was not processed. The same amount of the same adhesive was used in both cases. The two coated papers had the following properties:

| | Coated paper made from— | |
|---|---|---|
| | Raw clay | Processed clay |
| Gloss (Bausch & Lomb) | 36 | 50 |
| Smoothness (Bekk) | 428 | 535 |
| Brightness (Gen. Elec. reflectometer) | 73.8 | 75.2 |
| Printing | | (¹) |

¹ More uniform solids, sharper half tones, brighter high lights.

The reasons for the improved smoothness and gloss obtained with clay subjected to this treatment is believed to be due to a breaking down of a considerable proportion of relatively large kaolinite crystals which cause the roughness and dullness of the coating surface, but without significant change in the size of the smaller crystals. These crystals are commonly rod-shaped with cleavage planes at right angles to the longer dimension of the particle. Water added to the clay is thought to enter into the crystals in a manner which facilitates splitting up of the kaolinite crystals along their cleavage planes when subjected to the shearing action described.

Presumably, when the clay is too dry for satisfactory working, the larger crystals are more resistant to the shearing action of the rolls. On the other hand, the effect of excess moisture would seem to be a reduction in the cohesion of the mass so that there is less strain imposed on the larger crystals by the shearing action of the rolls. Otherwise stated, in the more fluid mass there is less resistance to movement of the crystals in the mass under the action of the rolls.

As measured by results obtained, my treatment is essentially different from grinding processes as carried out in ball mills, etc. While it is possible by grinding of the clay to increase the smoothness and gloss obtainable on paper coated therewith, a large part of the energy expended in a grinding operation is expended in subdividing the smaller particles, with the result that for any given increase in gloss there is a corresponding increase in adhesive requirements. With my process, on the other hand, there results a notable improvement in gloss with no considerable increase in adhesive requirements unless the treatment is greatly prolonged.

There is probably some breaking up of the smaller particles of the clay during the processing of the clay in accordance with my invention, but this action is small in comparison with the action on the larger crystals and becomes significant in its effect on the adhesive requirements only upon prolonged treatment.

In the above example the clay was run through the rolls ten times. In other tests the same clay passed through the rolls as many as forty times, and although this product gave a coated paper having a substantially higher finish than the clay which had been processed ten times, it required considerably larger quantities of casein to be bound to the paper. The precise point at which the processing is discontinued therefore depends upon whether one desires a product having considerably increased finishing properties with little or no increase in adhesive requirements, or whether a still higher finished product is desired with, however, increased adhesive requirements.

Microscopic examination and sedimentation measurements of the processed clays in comparison with the untreated clay seem to confirm the above stated conclusions. A clay containing crystals over 12 mu in length to an amount of approximately 13% was processed as described in the above described example. Examination at this point showed a 50% reduction in the percentage of crystals of this size, with but a slightly discernible change in the fineness of the smaller particles.

Although I have described the process as being carried out between rotating rolls, other devices, e. g. edge runners, extruding machines, etc., may be used provided the desired "shearing" action is exerted upon the moist but substantially solid china clay mass. The action if severe enough and repeated to the indicated extent will yield the desired improvement. This can be demonstrated by making up one coating composition with the treated clay and one with the untreated clay, applying them to like paper webs, drying and supercalendering both webs in the same manner, and measuring their gloss on the Bausch and Lomb Glossmeter. The gloss on the web coated with the treated clay will then be at least ten units (per cent gloss) higher than that on the web coated with the untreated clay, assuming that a clay having at least a moderate proportion of larger kaolinite crystals was used as the starting material. The treated clay will also be found to require substantially no more adhesive than the untreated clay, which distinguishes this process from grinding processes, as hereinbefore described.

The sand, mica, and other impurities may be separated from the clay treated according to the process of this application by air separation, flotation, or any of the other methods employed for the purpose.

The expression "shearing action" is used herein to define the action of the rolls on the clay by analogy to the movement of the particles of metal in a beam or bar when subjected to a shearing strain. It is believed that the particles of clay as the mass passes the rolls have a similar relative movement. The action as described is characterized by a transmission of stress from the rolls or other pressure devices through the mass to the individual crystals, which are themselves much too small and too numerous to be contacted and broken by the roll surfaces, except by use of colloid mills, ink mills, or other devices having only a very small fraction of the capacity of the present process. The action on the crystals takes place within the mass and largely at great distances (relative to the crystal size) from the point of application of pressure to the mass, thus making possible the simultaneous breaking up of the larger crystals throughout the thickness of a relatively thick layer. It is this characteristic of the present process which is primarily responsible for the large output which can be obtained by its use.

The invention has been described with particular reference to the treatment of china clay for use as a filler for paper coating compositions and for uncoated paper. In addition the product has enhanced value as a filler for other materials such as paints, rubber, and synthetic plastics.

I claim:

1. In a process of preparing fillers from clay consisting predominantly of kaolinite crystals of a length not exceeding 5 microns but containing a substantial percentage of crystals of greater length the step of working said clay under pressure between relatively-moving, pressure-applying, crushing elements set to maintain a pressure on the clay not substantially less than 100 pounds per linear inch while containing an amount of water between 5 and 27 percent, sufficient to facilitate cleavage of said larger crystals but insufficient to prevent transmission of stresses through the mass to individual crystals therein, until a substantial portion of said larger crystals are broken down to a particle size not exceeding 5 microns in length.

2. In the process of preparing fillers, the step of repeatedly subjecting china clay consisting of kaolinite crystals of varying lengths with at least 10 percent of a length in excess of 10 microns to shearing stresses applied by relatively-moving, pressure-applying, crushing elements set to maintain a pressure on the clay of not substantially less than 100 pounds per linear inch while the clay contains an amount of moisture between about 5 and 27 percent sufficient to facilitate cleavage of the kaolinite crystals, but is dry enough to transmit stress through the mass to individual crystals therein, until more than 50 percent of said crystals are reduced to a length of 5 microns or less.

3. In the process of preparing fillers, the step of repeatedly subjecting china clay consisting of kaolinite crystals of varying lengths with at least 10 percent of a length in excess of 10 microns to rolling pressure of not substantially less than 100 pounds per linear inch while the clay contains an amount of moisture between about 5 and 27 percent sufficient to facilitate the cleavage of the kaolinite crystals, but is dry enough to transmit stress through the mass to individual crystals therein, until more than 50 percent of said crystals are reduced to a length of 5 microns or less.

4. In a process of treating clay consisting of kaolinite crystals of varying lengths for use in paper coating compositions, the step which comprises repeatedly passing clay in a substantially solid mass between rolls under pressure of not less than 100 pounds per linear inch and maintaining the moisture content of the clay during treatment between 5 and 27 percent, and sufficient to facilitate cleavage of said large crystals, but insufficient to prevent transmission of stresses through the mass to the individual crystals therein.

WILSON F. BROWN.